July 31, 1934.  J. B. ARMITAGE  1,968,276
MILLING MACHINE TRANSMISSION AND CONTROL
Filed Aug. 4, 1932   9 Sheets-Sheet 1

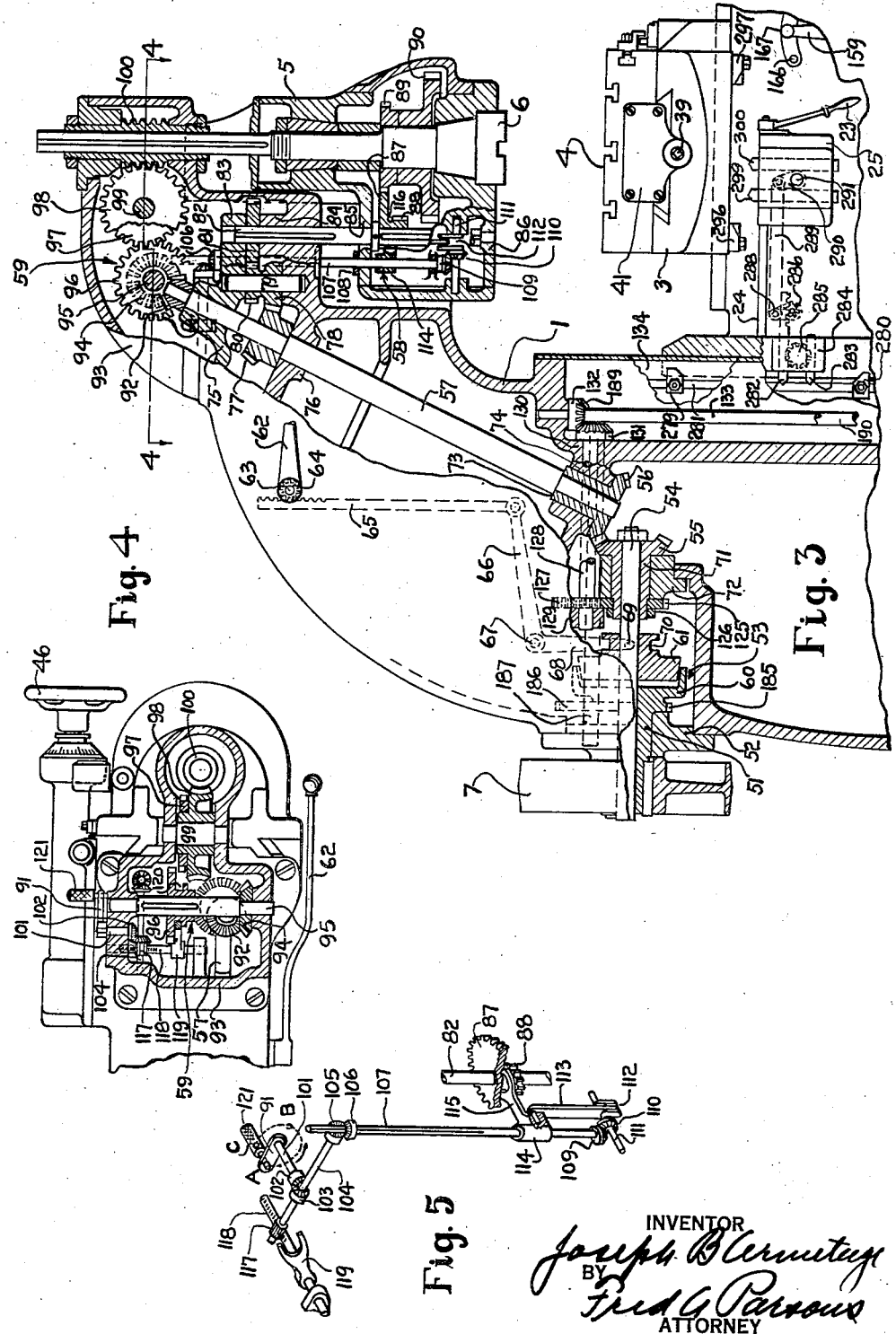

July 31, 1934.     J. B. ARMITAGE     1,968,276
MILLING MACHINE TRANSMISSION AND CONTROL
Filed Aug. 4, 1932     9 Sheets-Sheet 4
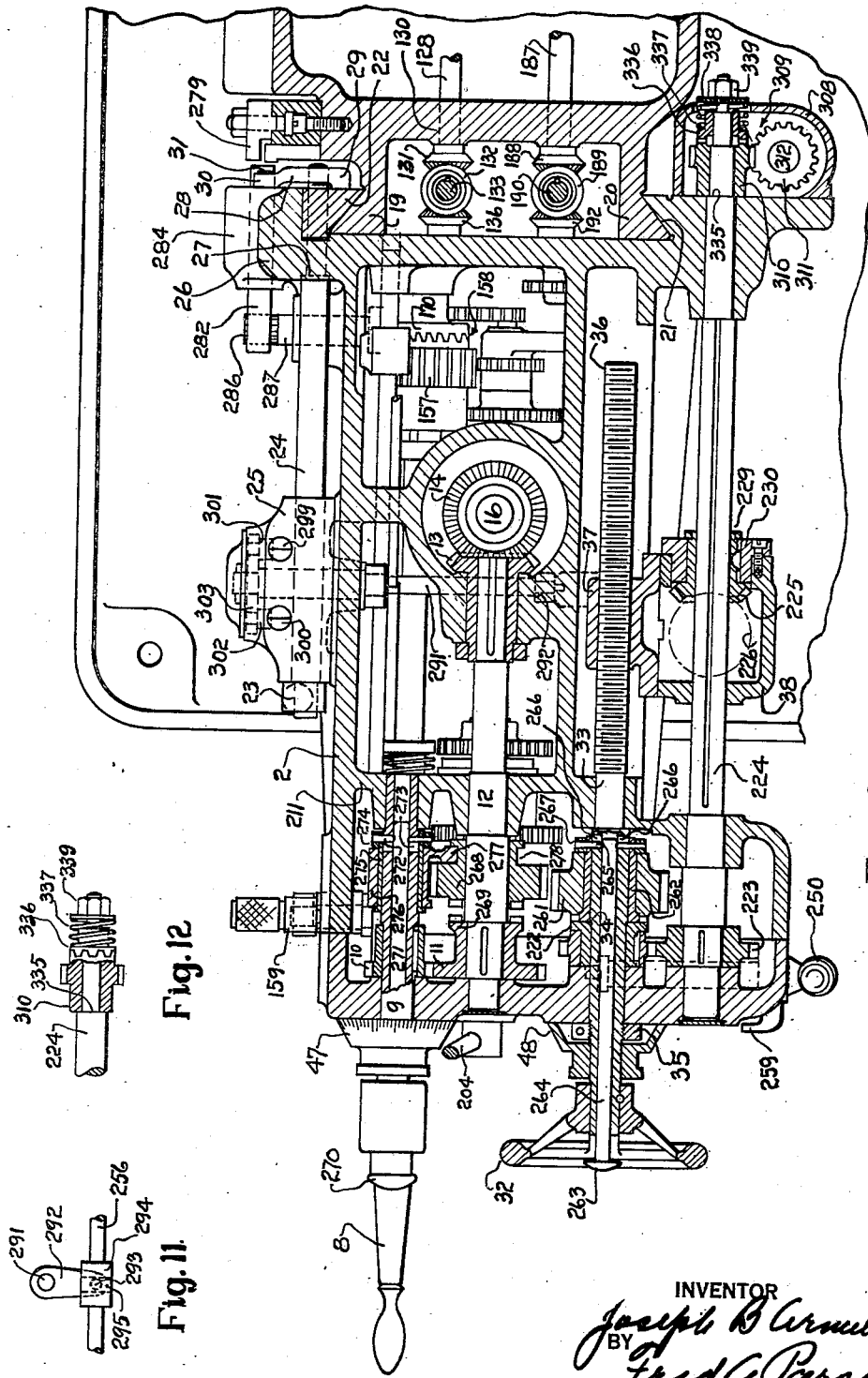

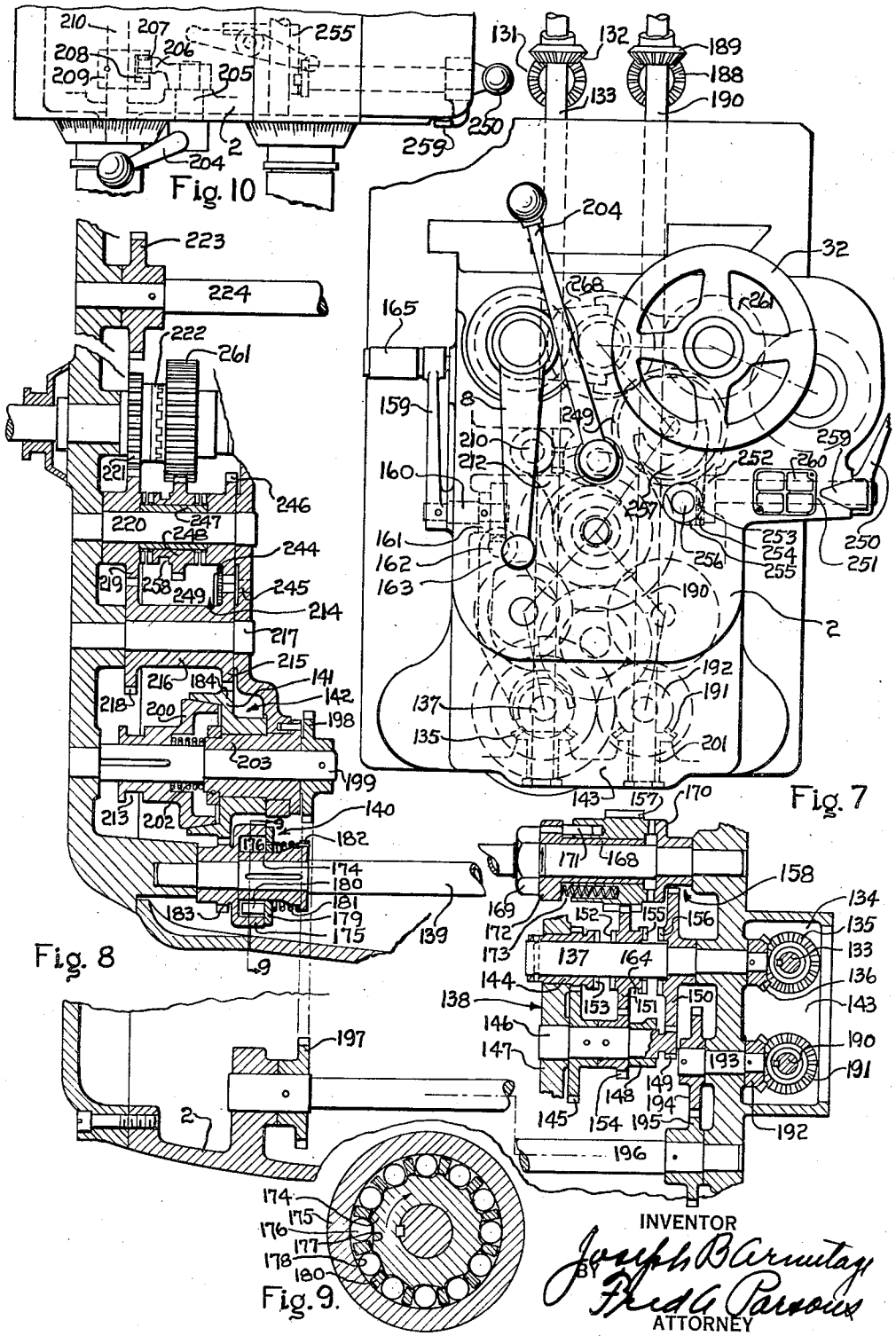

July 31, 1934.  J. B. ARMITAGE  1,968,276
MILLING MACHINE TRANSMISSION AND CONTROL
Filed Aug. 4, 1932   9 Sheets-Sheet 6
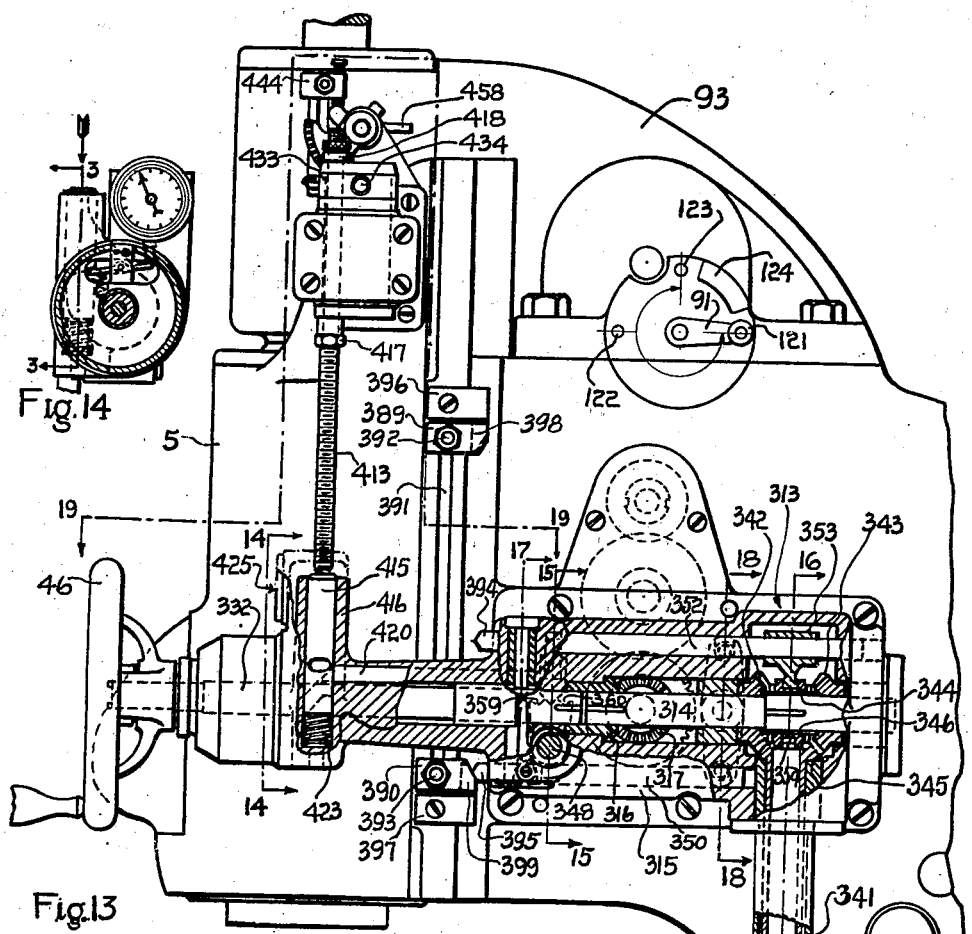
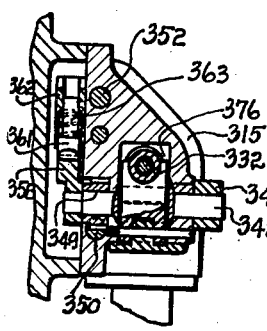
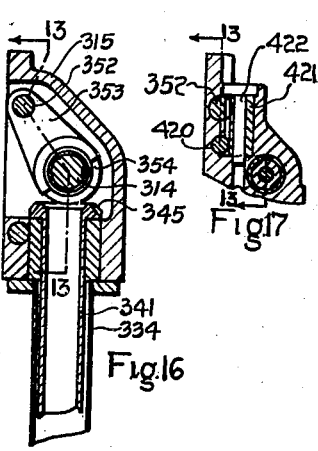
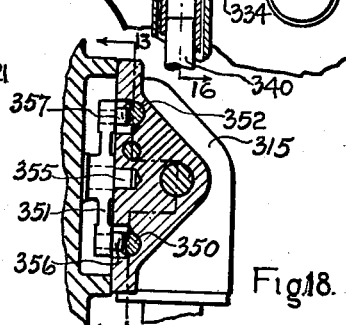
INVENTOR
Joseph B Armitage
BY Fred A Parsons
ATTORNEY

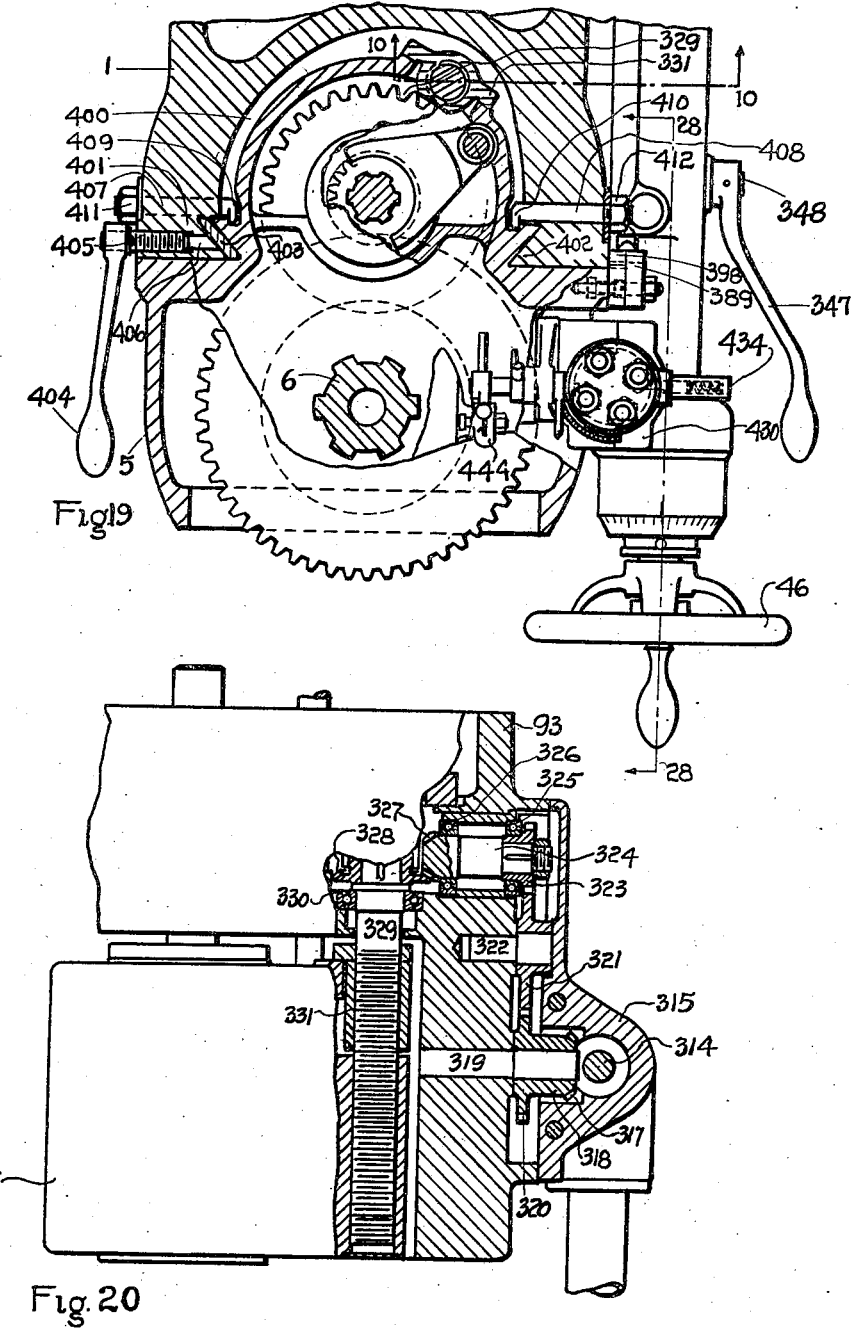

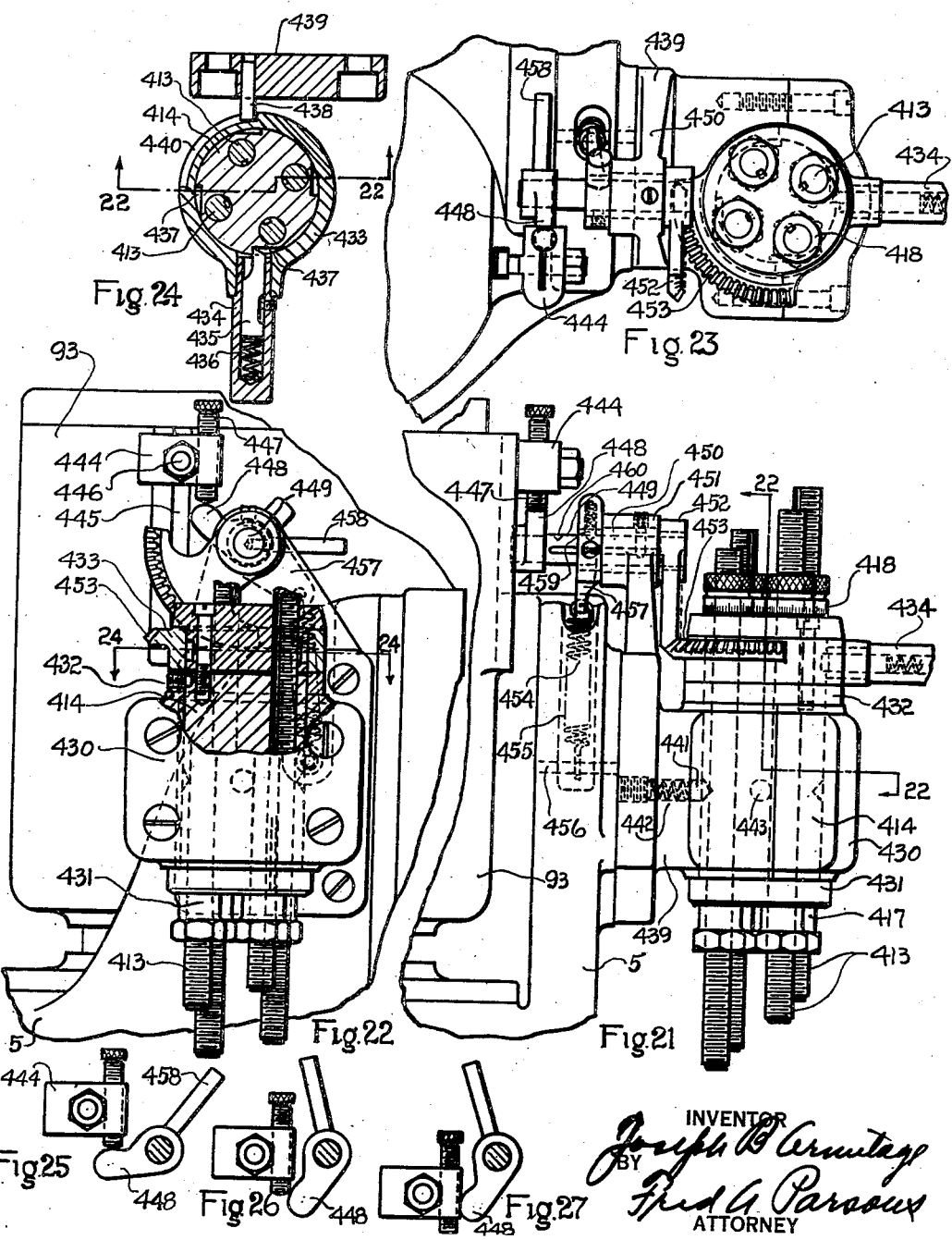

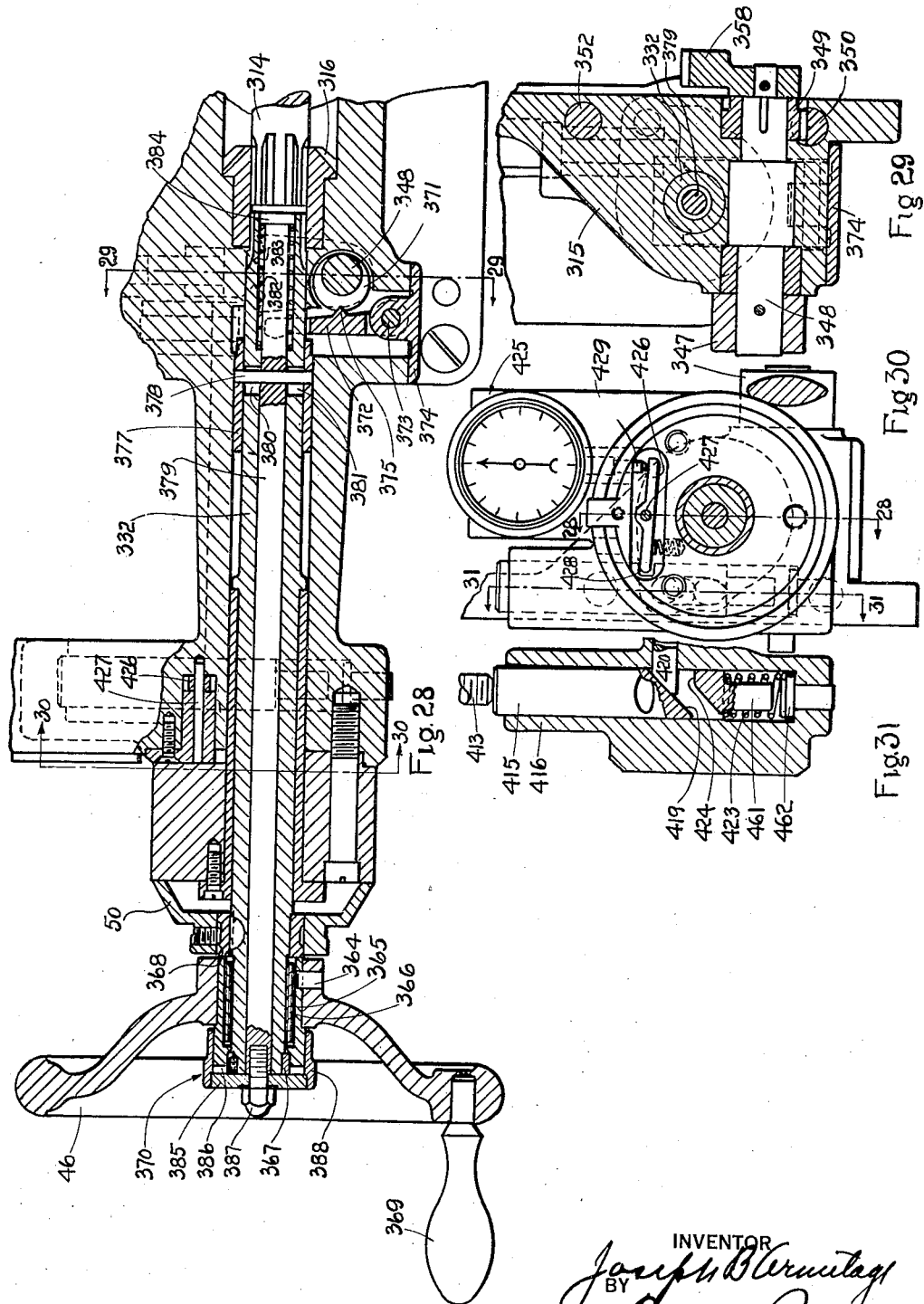

Patented July 31, 1934

1,968,276

UNITED STATES PATENT OFFICE 1,968,276

MILLING MACHINE TRANSMISSION AND CONTROL

Joseph B. Armitage, Wauwatosa, Wis., assignor to Kearney & Trecker Corporation, West Allis, Wis.

Application August 4, 1932, Serial No. 627,412

9 Claims. (Cl. 90—19)

This invention relates to milling machines and more particularly to transmission and control mechanism therefor.

An object of the invention is to provide improved transmission and control mechanism for the relative positioning of the tool spindle and work table of a milling machine in a predetermined spaced relationship for a desired cutting movement, and irrespective of a preceding relative position thereof.

Another object is to provide transmission and control mechanism such as previously mentioned but in addition adapted to predetermine a series of such predetermined relative positions whereby, for instance, a series of surfaces of different height may be cut on a work piece in predetermined relative spacing.

Another object is to provide an improved combination of transmission and control mechanism such as previously mentioned with power trip mechanism for roughly or approximately establishing the predetermined relative position of the cutter and work support, and also the combination of such power trip mechanism with supplementary mechanism for very exactly determining such relative position.

Another object is to provide positioning mechanism such as previously mentioned in combination with manual means for movement of the spindle or work support.

Another object is to provide some or all of the devices previously mentioned in an improved relationship with one another or with transmission and control mechanism for effecting normal or ordinary movements or tripping of the machine when the functions of such devices are not necessary or are undesirable.

Another object relates to an improved arrangement for some or all of the previously mentioned purposes in a milling machine of the vertical spindle knee type, and more particularly for movement and control of a vertically movable spindle carrying slide.

Other objects relate generally to improvement and simplification in the construction and operation of milling machines incorporating devices for some or all of the previously mentioned purposes, and still other objects will be understood from this specification and the accompanying drawings.

The invention is herein shown incorporated in a vertical spindle knee type milling machine, the construction and operation of which may be fully understood from the following specification taken in connection with the accompanying drawings in which:

Fig. 3 is a partial sectional view of the machine taken in various vertical planes to show certain of the internal mechanism.

Fig. 4 is a horizontal sectional view on the line 4—4 of Fig. 3.

Fig. 5 is an isometric view of certain shifter mechanism.

Fig. 6 is a horizontal sectional view on the line 6—6 of Fig. 2.

Fig. 7 is an enlarged front elevation of a portion of the machine indicated in Fig. 2.

Fig. 8 is a development of certain mechanism indicated in Figs. 6 and 7.

Fig. 9 is a vertical sectional view of a clutch shown in Fig. 8, taken on the line 9—9 of Fig. 8.

Fig. 10 is a plan view of a portion of the machine shown in Fig. 7.

Fig. 11 is a detail of certain mechanism shown in Fig. 6.

Fig. 12 is a detail of certain mechanism indicated in Fig. 6.

Fig. 13 is an enlarged sectional view taken on various vertical planes, showing certain mechanism indicated in Fig. 1.

Fig. 14 is a sectional view taken on the line 14—14 of Fig. 13.

Fig. 15 is a sectional view on the line 15—15 of Fig. 13.

Fig. 16 is a sectional view on the line 16—16 of Fig. 13.

Fig. 17 is a sectional view on the line 17—17 of Fig. 13.

Fig. 18 is a sectional view on the line 18—18 of Fig. 13.

Fig. 19 is a sectional view on the line 19—19 of Figs. 2 and 13.

Fig. 20 is a sectional view on the line 20—20 of Fig. 19.

Fig. 21 is an enlarged front elevation of certain mechanism indicated in Fig. 2.

Fig. 22 is a right side elevation of the same, partly in section along the line 22—22 of Figs. 21 and 24.

Fig. 23 is a plan view of the mechanism shown in Fig. 21.

Fig. 24 is a sectional view on the line 24—24 of Fig. 22.

Figure 1:
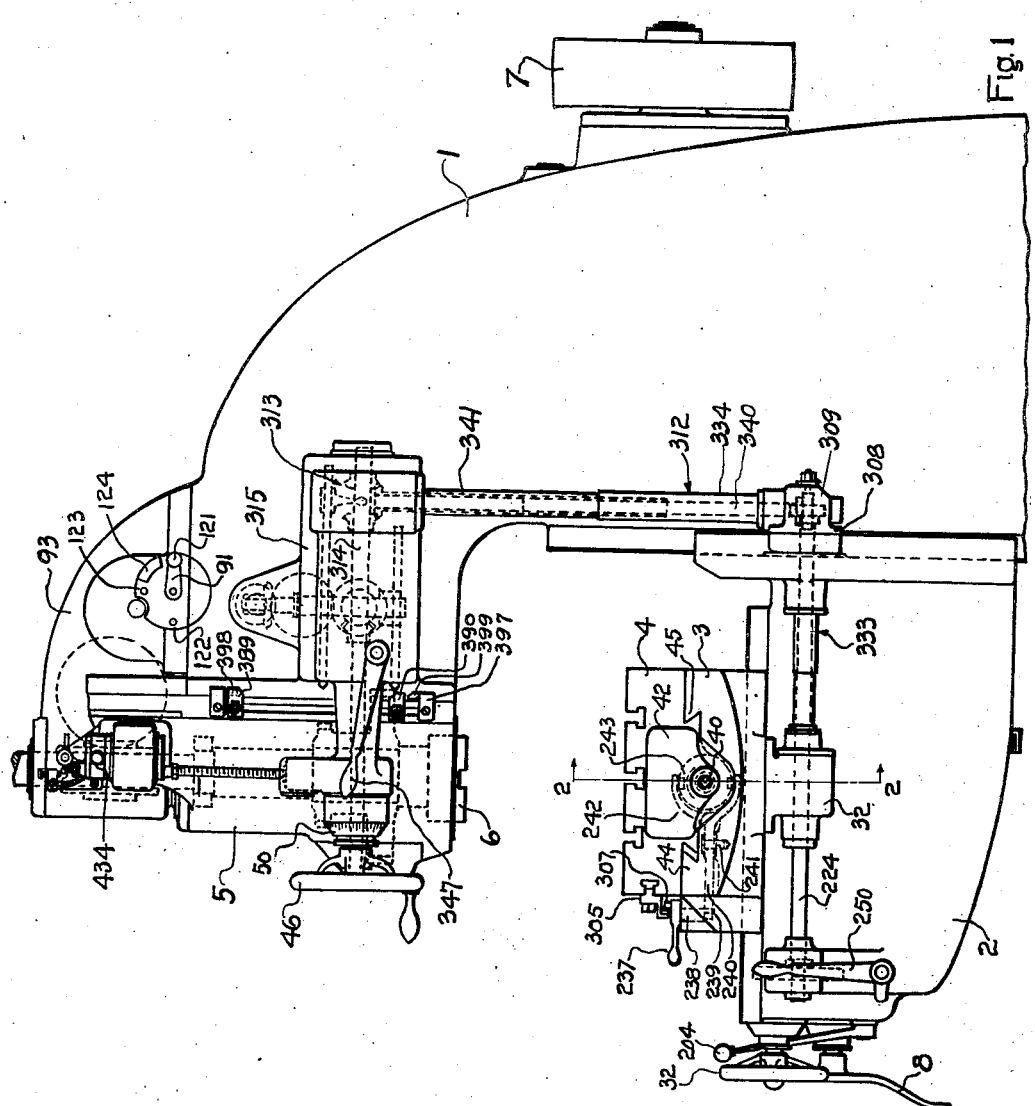
Fig. 1 is a right side elevation of a milling machine, partly broken away, and incorporating the invention.

Figs. 25, 26, and 27 are right side elevations of certain mechanism shown in Fig. 22, showing the parts in different position.

Fig. 28 is an enlarged sectional view on the line 28—28 of Fig. 19.

Fig. 29 is a sectional view on the line 29—29 of Fig. 28.

Fig. 30 is a sectional view on the line 30—30 of Fig. 28, certain parts being removed.

Fig. 31 is a sectional view on the line 31—31 of Fig. 30.

Like reference characters have been applied to the same parts throughout the specification and drawings.

Figure 2:
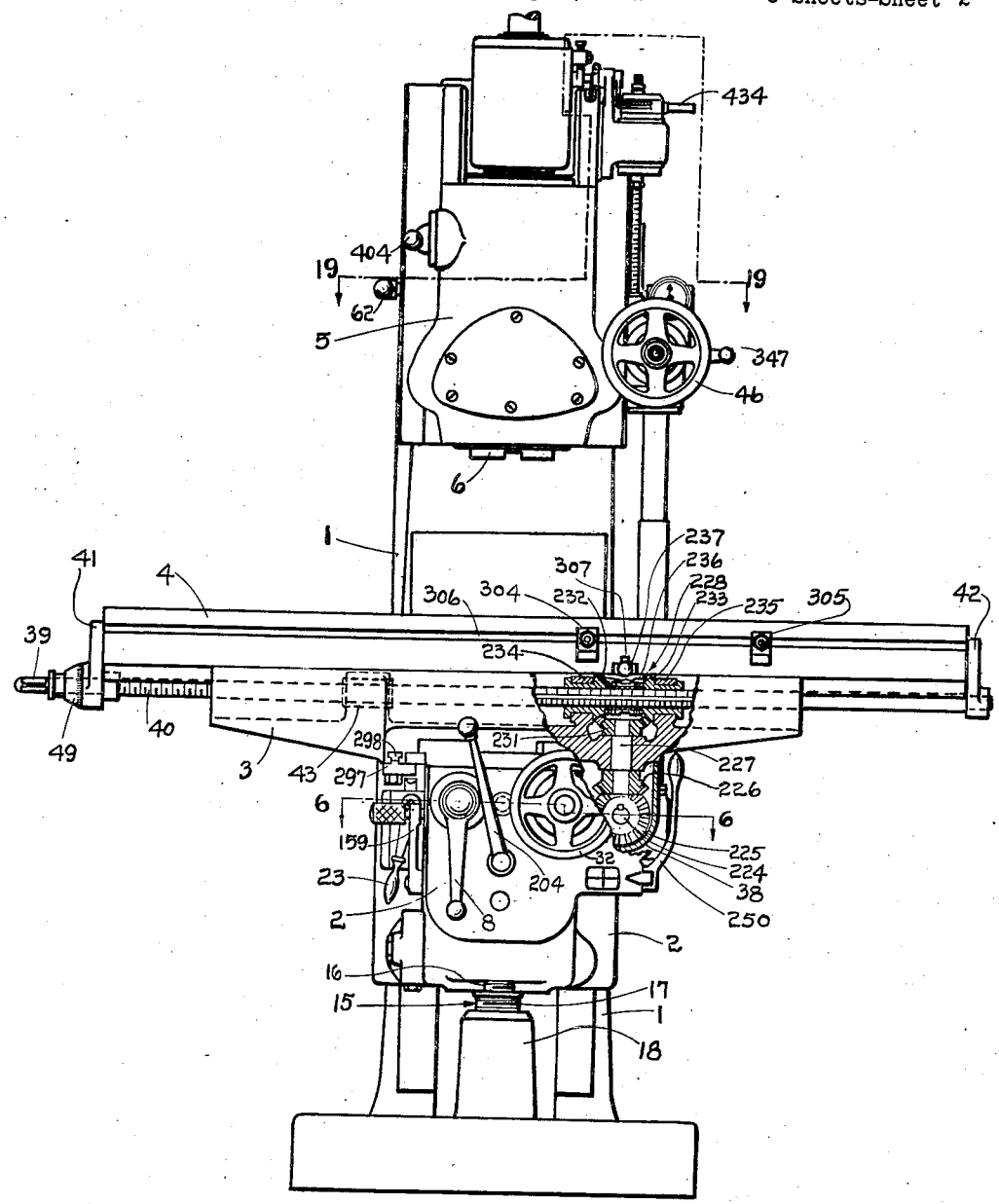
Fig. 2 is a front elevation of the same machine, partially in section on the line 2—2 of Fig. 1.

The illustrated machine incorporating the invention comprises a column or support 1, Figs. 1 and 2, supporting for vertical adjustment relative thereto a knee or support 2 carrying a movable saddle or support 3 adjustable toward and from column 1, the saddle supporting for substantially horizontal reciprocation a work table or support 4. Column 1 also supports for vertical movement a spindle carrying head or support 5 which has journaled therein, in the present instance, a substantially vertical tool spindle or support 6. The various support members may be moved either manually or by power from a suitable power source, in the present instance indicated as a pulley 7, connections and transmissions of suitable type being provided as completely disclosed hereinafter.

Thus hand movement of knee 2 may be obtained by manipulation of a hand crank, or the like, 8, the crank being fixed as shown in Fig. 6 with a shaft 9, journaled in the knee and driving, through intermeshing gears 10 and 11, a shaft 12. Shaft 12 extends backwardly in the knee and drives, through bevel gears 13 and 14, an elevating screw generally denoted by numeral 15, Fig. 2, and comprising, in the present instance, telescoping sections 16 and 17, section 17 being threaded in a pedestal 18 fixed with a portion of column 1, section 16 being threaded in section 17 and engaging knee 2 through a suitable thrust bearing, not shown. Bevel gear 14 is fixed with section 16 and rotation of crank 8 accordingly causes rising or falling of the knee.

Knee 2 is guided for vertical movement relative to column 1 by means of slides of appropriate form, in the present instance being shown as dovetailed portions 19 and 20, Fig. 6, the knee at 21 having a portion fitting portion 20, and there being a gib 22 cooperating with portion 19 to clamp the knee or to provide correct running clearance, as required. Gib 22 may be adjusted or clamped, in the present instance, by manipulation of a hand lever 23 fixed with a rod 24 journaled in extending portions 25 and 26 fixed with knee 2, the rod being fixed against axial movement by means of a shoulder 27, and passing through a suitable bore in gib 22. The rod threadedly engages a shoe 28 having a heel portion 29 engaging gib 22 and a toe portion 30 loosely embracing a pin 31 fixed with portion 26 to prevent rotation of the shoe. Manipulation of handle 23 may accordingly cause heel portion 29 to bear strongly against gib 22, thus clamping the knee rigidly with column 1.

Hand movement of saddle 3 may be obtained from a hand wheel, or other appropriate member, 32, Fig. 6, fixed with a shaft 33 journaled in knee 2 and restrained from axial movement by means of a shoulder 34 and a collar 35, cooperating respectively with appropriate portions of knee 2. Shaft 33 engages by means of a threaded portion 36 a nut 37 fixed with a housing portion 38 depending from saddle 3, manipulation of the hand wheel accordingly causing sliding of saddle 3. The saddle is guided for such movement on knee 2 by means of suitable guides, not particularly shown, but which may be of any suitable construction of which several are appropriate and well known.

Hand movement of table 4 may be obtained through a crank, or the like, not shown, applied to a squared portion 39, Fig. 2, of a table screw 40 journaled and restrained against axial movement relative to table 4 in bearings 41 and 42 fixed with the table. Table screw 40 engages a nut portion 43 fixed with saddle 3, rotation of the screw accordingly causing sliding of table 4, the table being fitted for such movement in suitable guides 44 and 45, Fig. 1.

Hand movement of spindle head 5 is available from a hand wheel, or the like, 46, Fig. 1, through appropriate mechanism, fully described below, and for convenience in setting up the machine and for other purposes dials are provided on the various control shafts. Thus a dial 47, Fig. 6, is adjustably fixed with the knee elevating shaft 9; a dial 48 is adjustably fixed with saddle screw shaft 33; a dial 49, Fig. 2, is fixed with table screw 40; and a dial 50, Fig. 1, is adjustably fixed to rotate with hand wheel 46.

Spindle 6 is driven from pulley 7 as follows: Pulley 7 as shown in Fig. 3 is fixed with and drives a sleeve 51 journaled in a closure member 52 and forming part of a main clutch generally denoted by numeral 53. Clutch 53 drives a shaft 54 which drives, through bevel gears 55 and 56, an upwardly extending shaft 57, shaft 57 driving spindle 6 alternatively through primary gearing contained in spindle head 5 and generally denoted by numeral 58, or through secondary gearing generally denoted by numeral 59.

Clutch 53 comprises interengaging outer and inner members 60 and 61 respectively, member 60 being fixed with sleeve 51 and member 61 being slidably keyed with shaft 54, shaft 54 being journaled in a suitable bore in member 60 and sleeve 51 forming a pilot bearing for the shaft. Member 61 when moved to the left, as seen in Fig. 3, will accordingly engage member 60 and drive shaft 54 and its connected mechanism, but when moved to the right, will allow sleeve 51 and member 60 to rotate without driving shaft 54. Member 61 may be so moved from a hand lever 62, in the present instance located at the left side of column 1 and fixed with a shaft 63, the shaft carrying within the column a gear 64 engaging through suitable rack teeth a shifter rod 65 vertically slidable in the column and pivotally connected to a bell crank 66 fulcrumed on a stud 67 fixed with column 1. Bell crank 66 has a portion 68 carrying a pivoted shoe, or the like, 69 engaging an annular groove 70 in member 61. Upward movement of lever 62 will accordingly cause engagement of clutch 53, while downward movement will cause disengagement thereof.

Bevel gear 55 has a sleeve portion 71 journaled in a closure member 72 fixed inside column 1, sleeve portion 71 being fixed with shaft 54 and forming a journal therefor. Gear 56 has a sleeve portion 73 fixed with shaft 57 and forming a journal therefor, portion 73 being journaled in a bearing 74 supported in column 1.

Shaft 57 actuates primary gearing 58 as follows: The shaft is supported at its upper end in bearings 75 and 76 fixed with column 1 and drives the primary gearing 58 through a bevel gear 77, gear 77 driving a gear 78 journaled on a stud 79 and having fixed therewith a gear 80. Gear 80 meshes with and drives a gear 81 slidably keyed with a shaft 82 extending downwardly into a portion of spindle head 5, the gear being restrained against axial movement by means of bearings 83 and 84 fixed with column 1. Shaft 82 is journaled in bearings 85 and 86 in head 5 and restrained thereby against axial movement relative to the head. Vertical movements of the head are thereby accommodated by sliding of shaft 82 through gear 81. Shaft 82 drives spindle 6 through gears 87 and 88 fixed together and slidably keyed with shaft 82 in head 5, the gears meshing respectively one at a time with gears 89 and 90 fixed with spindle 6. The gears being of different sizes, engagement of different pairs will result in different speeds in spindle 6. Gears 87 and 88 may be shifted from a crank, or the like, 91, Fig. 4, through mechanism which will be described presently.

Secondary gearing 59 comprises a bevel gear 92, Figs. 3 and 4, fixed with shaft 57 and enclosed in a housing 93 fixed with column 1, the gear meshing with and driving a bevel gear 94 fixed with and driving a shaft 95 journaled in housing 93 and having slidably keyed therewith a gear 96. Gear 96 may be shifted into or out of engagement with a gear 97 fixed with a worm wheel 98 fixed with a shaft 99 also journaled in housing 93, worm wheel 98 engaging a worm 100 journaled in housing 93 and slidably keyed with spindle 5. Worm 100 is of such pitch and characteristics that it may be driven by worm wheel 98 to provide relatively high spindle speeds. Vertical movement of head 5 is accommodated by the sliding connection between spindle 6 and worm 100.

Primary gearing 58 and secondary gearing 59 conjunctively provide a rate changer yielding a plurality of speeds in spindle 6, there being suitable shifter mechanism provided therefor. Crank 91, Figs. 3, 4, and 5, is fixed with a shaft 101 journaled in housing 93 and driving, through bevel gears 102 and 103, a shaft 104 suitably journaled in housing 93, shaft 104 driving, through bevel gears 105 and 106, a vertical shaft 107 extending downwardly into head 5, the shaft being restrained against axial movement relative to the head by a collar, or the like, 108, and a bearing 109. Gear 106 is slidably keyed with shaft 107 whereby vertical movement of head 5 may be permitted by movement of shaft 107 through the gear. Shaft 107 drives, through bevel gears 109 and 110, a shaft 111 journaled in head 5 and actuating, through a cranked portion 112 and a pitman 113, a shifter fork 114 slidably journaled on shaft 107 and having a portion 115 engaging an annular groove 116, in the present instance formed between gears 87 and 88. Rotation of shaft 111 through the above outlined connections will accordingly cause shifting of gears 87 and 88 into engagement alternatively with gears 89 and 90 respectively. Shaft 104 actuates, through a pinion 117 fixed therewith, a shifter rod 118 slidable in housing 93 and carrying a shifter fork 119 engaging an annular groove 120 formed in a portion of gear 96. Rotation of crank 91 accordingly causes sliding of gear 96. The parts in the present instance are so proportioned that gear 96 will have a substantial amount of free travel before engaging gear 97.

Starting with the parts in the position indicated in Fig. 5, gears 87 and 88 will be in their lowermost positions, gear 88 being engaged with gear 90, Fig. 3. At this time gear 96 will be removed a maximum distance from gear 97, Fig. 4. Shifting crank 91 from position A to position B, Fig. 5, in the direction indicated will, through the described connections, rotate crank portion 112 from its lowermost to its uppermost position, thereby shifting gears 87 and 88 from engagement of gear 90 to engagement of gear 89 or into the position shown in Fig. 3. This will change the speed of spindle 6 from its lowest to an intermediate speed. This shifting will also move gear 96 close to but not engaging gear 97, the parts now being in the positions shown in Figs. 3 and 4. A further shifting of crank 91 from position B to position C, Fig. 5, will rotate crank portion 112 to an intermediate position between its lowermost and uppermost positions, thereby shifting gears 87 and 88 to a position engaging neither of gears 89 and 90, this last shifting movement engaging gear 96 with gear 97 and causing a drive to spindle 6 through above mentioned worm wheel 98 and worm 100 for a maximum speed of the spindle. Crank 91 has a grip portion 121 comprising a spring pressed plunger engaging holes such as 122 and 123, Fig. 1, for maintaining the parts in shifted positions. In order to prevent excessive movement of crank 91, an abutment 124 is provided in the path thereof. It is understood that the shifting arrangement here shown is merely illustrative and that the principles thereof might be modified to a large extent within the scope of the present application.

A feed drive for the various supports originates in shaft 54, Fig. 3, whereby it is responsive to the position of engagement of clutch 53, the shaft driving, through a gear 125 fixed with above mentioned sleeve 71, by suitable means, such as a nut 126, a gear 127 fixed with a shaft 128 journaled in suitable bearings 129 and 130 in column 1 and driving, through bevel gears 131 and 132, a vertical shaft 133 disposed in a recess 134 in the front of column 1. Shaft 133 drives, through bevel gears 135 and 136, Figs. 6, 7, and 8, a shaft 137 journaled in knee 2 and driving, through a rate changer generally denoted by numeral 138, a shaft 139 extending forwardly in knee 2 and driving, through an overrunning clutch generally denoted by numeral 140, a member 141 constituting part of a feed-rapid traverse clutch generally denoted by numeral 142, a member 141 constituting the terminal element of the feed train.

Gear 132 is fixed with vertical shaft 133, the shaft being journaled and prevented from axially moving relative to column 1 by suitable means not particularly shown, while gear 135 is rotatively supported from a housing portion 143 extended from knee 2 and slidably keyed with shaft 133 to permit vertical movement of the knee while maintaining the driving connection between shaft 133 and the feed mechanism in the knee.

Rate changer 138 comprises above mentioned shaft 137, driving, through a gear member 144, a gear 145 fixed with a shaft 146 journaled in bearings 147 and 148 fixed with knee 2, shaft 146 driving, through a gear 149 fixed therewith, a gear 150 journaled on above mentioned shaft 137. A gear 151 is slidably journaled on shaft 137 and has clutch teeth 152 for engagement in one position with complementary clutch teeth 153 fixed with gear member 144. In another position gear 151 meshes with a gear 154 fixed with shaft 146, and in still another position clutch teeth 155 fixed with gear 151 may engage clutch teeth 156 fixed with gear 150. Gear 151 meshes in all positions with a wide faced gear 157 forming part of an overload release device generally denoted by numeral 158. The various gears are of different sizes whereby a plurality of speeds in gear 157 will result from shifting of gear 151 to its various positions. Gear 151 may be so shifted from a hand lever 159, Figs. 6 and 7, fixed with a shaft 160 journaled in the left wall of knee 2 and carrying within the knee a gear 161 fixed with the shaft. Gear 161 meshes with suitable rack teeth formed in a shifter rod 162 extending backwardly in the knee and slidable relative thereto. Rod 162 has fixed therewith a shifter fork 163 extending downwardly into engagement with an annular groove 164, Fig. 8, formed in gear member 151. Lever 159 has a grip portion 165, Fig. 3, constituting a spring pressed plunger engageable with suitable sockets or holes such as 166 and 167, Fig. 3, in the wall of knee 2 for maintaining the parts in shifted positions.

Overload release device 158 comprises a sleeve member 168 journaled on shaft 139 between an adjusting nut 169 and a clutch member 170 fixed with shaft 139. Above mentioned gear 157 is slidably journaled on sleeve 168 and prevented from rotating thereon by means of a pin, or the like, 171 fixed with a collar portion 172 of sleeve 168, the pin extending into a suitable bore formed in gear member 157. A spring 173 disposed in a bore in gear member 157 acts between collar 172 and gear 157 to continuously urge the latter to the right, as seen in Fig. 8. The gear and clutch member 170 have interengaging clutch teeth, as more particularly shown in Fig. 6, having angular faces tending in response to torque to force gear member 157, Fig. 8, to the left against the force of spring 173 to allow relative rotation between gear 157 and clutch member 170, thereby limiting the stress in shaft 139 and the connected parts to a predetermined safe amount.

Overrunning clutch 140 comprises inner and outer members 174 and 175, Fig. 8, member 174 being fixed with shaft 139 and driving member 175 through rolls 176, Fig. 9, received between cam recesses 177 in member 174 and a bore 178 in member 175. Recesses 177 are so formed that upon rotation of member 174 in one direction, the rolls will be locked by a wedging action between members 174 and 175 and will transmit a positive driving action to member 175, but in the event that member 175 tends to rotate at a rate greater than the member 174, the rolls will be carried around by contact with bore 178 and the wedging action destroyed, member 175 then rotating freely without interference from or with member 174. For maintaining the rolls continuously in position to establish such wedging action, a cage member 179, Fig. 8, is journaled on a portion of member 174 and provided with fingers 180 extending between rolls 176, the cage being continuously urged in a direction opposite to the rotation of member 174 by means of a torsion spring 181 fixed between the cage and a flange portion 182 of member 174. Member 175 is journaled on shaft 139 and carries a gear 183 driving a gear 184 fixed with above mentioned clutch member 141.

A rapid traverse drive for the various supports originates in a gear 185, Fig. 3, fixed with clutch member 60 whereby to be independent of the condition of engagement of clutch 53. Gear 185 drives a gear 186 fixed with a shaft 187 journaled in column 1 and driving, through bevel gears 188 and 189, Fig. 6, a vertical shaft 190, disposed in recess 134 and driving, through bevel gears 191 and 192, Figs. 7 and 8, a shaft 193 journaled in a wall of knee 2. Shaft 193 drives, through gears 194 and 195 fixed with the respective shafts, a shaft 196 journaled in knee 2 and driving, through gears 197 and 198, a shaft 199. Shaft 199 carries slidably keyed therewith a clutch member 200 constituting the terminal element of the rapid traverse train.

Bevel gear 191 has a downwardly extending sleeve portion 201 journaled in above mentioned housing portion 143, the sleeve being slidably keyed with shaft 190 whereby vertical movement of knee 2 will be permitted without disturbing the driving relation between shaft 190 and shaft 193.

Clutch 142 comprises above mentioned inner and outer members 200 and 141 having interengaging friction surfaces arranged to engage upon movement of member 200 to the right, as seen in Fig. 8, a spring 202 being interposed between member 200 and a bushing 203 fixed with a portion of knee 2 and forming a bearing for shaft 199 and a support or journal for clutch member 141. Clutch member 200 may be shifted from a hand lever 204, Figs. 7 and 10, fixed with a shaft 205 journaled in a front wall of knee 2, the shaft having fixed therewith inside the knee a lever arm 206 carrying a roll, or the like, 207 engaging a cam slot 208 in a member 209 fixed with a shifter rod 210 slidably supported in knee 2 and extending backwardly therein. Rod 210 is supported in an inner wall 211, Fig. 6, of knee 2 and has fixed therewith a shifter fork 212, Fig. 7, extending downwardly into engagement with an annular groove 213, Fig. 8, formed in clutch member 200. Movement of lever 204 in one direction will accordingly engage clutch 142, while movement thereof in the opposite direction will disengage clutch 142, cam slot 208 being shaped for desired movement of shifter rod 210 in response to movement of lever arm 206.

The feed and rapid traverse trains combine in clutch 142 and the drive continues from gear 184 to certain of the supports through a reverser generally denoted by numeral 214 and to others as follows: Gear 184 meshes with and drives a gear 215 constituting a part of reverser 142 and fixed with a sleeve member 216 journaled on a stud 217 fixed with the knee, the sleeve carrying a gear 218 driving a gear 219 journaled on a stud 220 and driving a gear 221 journaled on a clutch member 222, to be later described. Gear 221 drives, through a gear 223 meshed therewith, a shaft 224 journaled in a portion of knee 2 and more particularly shown in Figs. 1 and 6. Shaft 224 drives, through bevel gears 225 and 226, a vertical shaft 227, Fig. 2, journaled in a portion of saddle 3 and driving table screw 40 through a reverser generally denoted by numeral 228.

Bevel gear 225, as more particularly shown in Fig. 6, has an extended sleeve portion 229 journaled in a bearing 230 fixed with housing member 38 depending from saddle 3 and supporting above mentioned saddle nut 37. Sleeve 229 is slidably keyed with shaft 224 to permit adjustments or movements of the saddle without interference with the driving connections between shafts 224 and 227.

Reverser 228 comprises a bevel gear 231, Fig. 2, fixed with vertical shaft 227 and driving in opposite directions bevel gears 232 and 233 spaced apart and having sleeve portions respectively journaled in suitable bearings 234 and 235 supported from saddle 3, the bores of the sleeves freely embracing table screw 40. A clutch member 236 is slidably keyed with table screw 40 between gears 232 and 233 and is provided with suitable clutch teeth for engagement when moved in one direction with complementary teeth on gear 232 and other clutch teeth for engagement when moved in the opposite direction with complementary clutch teeth on gear 233. Clutch member 236 may be shifted into engagement with one or the other of the gears or into an inoperative or neutral position from a hand lever 237 fixed with a substantially vertical shaft 238, Fig. 1, journaled in saddle 3 and actuating, through an eccentric pin 239, a lever 240 fulcrumed on a stud 241 fixed with the saddle, the lever carrying a shifter fork 242 engaging an annular groove 243 formed in clutch member 236. Movement of the lever from side to side will accordingly cause engagement of the clutch member with one or the other of gears 232 and 233, the parts being so arranged that movement of the lever, for example, to the left will cause travel of table 4 to the left, while movement of the lever to the right will cause movement of the table to the right. Positioning of lever 237 between the two extremes mentioned shifts clutch member 236 to the above mentioned neutral position and stops the movement of the table.

Reverser 214, Fig. 8, comprises above mentioned gears 218 and 215, gear 218, as above described, driving gear 219 in one direction and gear 215 driving in the opposite direction, through an idler 244 journaled on a stud 245 fixed with knee 2, a gear 246 journaled on above mentioned stud 220. Gears 219 and 246 are spaced apart by means of a sleeve 247 having journaled thereon a clutch member 248. The clutch member has suitable clutch teeth for engagement when moved in one direction with complementary clutch teeth on gear 219 and other clutch teeth for engagement when moved in the opposite direction with complementary clutch teeth on gear 246, a gear 249 being fixed with clutch member 248 for communicating the drive to the connected transmission elements. Clutch member 248 may be shifted from a hand lever 250, Figs. 6, 7, and 10, fixed with a shaft 251 journaled in knee 2 and carrying within the knee a lever arm 252 engaging, through a pin 253, a slot 254 in a shifter member 255 fixed with a rod 256 extending rearwardly in knee 2 and slidable therein, member 255 having a fork portion 257 extending upwardly into engagement with an annular groove 258, Fig. 8, formed in clutch member 258. Lever 250 has an index 259 indicating on a plate 260 the direction of movement of the supports resulting from shifting of the lever.

Gear 249 meshes with and drives a clutch gear 261 which, as particularly shown in Fig. 6, is journaled on a sleeve 262 slidable on saddle screw 33, the gear being provided with suitable clutch teeth for engagement when the gear is moved to the left, as seen in Fig. 6, with complementary clutch teeth on above mentioned clutch member 222. Clutch member 222 is fixed with saddle screw 33 whereby when gear 261 is moved to the left and engaged therewith, the screw will be driven from gears 249 and 261 in a direction corresponding to the setting of reverser 214. Gear 261 may be so shifted from a manually operable member 263 fixed with a shifter rod 264 extending through a suitable bore in shaft 33 and connected through a pin 265 movable in a slot 266 in shaft 33 with a collar 267 fixed with sleeve 262. Movement of member 263 to the left and right, as seen in Fig. 6, will accordingly cause corresponding movement of gear 261 and engagement or disengagement thereof with clutch member 222. Clutch gear 249 also drives a gear 268, Figs. 6 and 7, journaled on above mentioned shaft 12 and having suitable clutch teeth for engagement when moved to the left, as seen in Fig. 6, with complementary teeth on a clutch member 269 fixed with shaft 12. Gear 268 may be so shifted from a manually operable member 270 fixed with a shifter rod 271 slidable in a bore in above mentioned shaft 9, the rod connecting, through a pin 272 movable in a slot 273 in shaft 9, with a collar 274 fixed with a sleeve 275 slidable on shaft 9. Sleeve 275 has journaled thereon a shifter member 276 restrained from axial movement relative to the sleeve and having a fork portion 277 engaging an annular groove 278 formed in gear member 268. Movement of member 270 to the left and right will accordingly cause corresponding movement of gear 268 and engagement or disengagement thereof respectively with clutch member 269, rotation of shaft 9, however, being permitted through the rotative relation existing between sleeve 275 and shifter member 276.

It is noted that gears 261 and 268, Fig. 6, are shown as somewhat larger than their driving gear 249, Figs. 7 and 8. This would normally result in a slower rate of travel of knee 2 and saddle 3 than that of table 4. This may be desirable for a number of reasons which it is considered unnecessary to discuss here, since obviously the gears could be arranged to give substantially any desired ratio within the scope of the present invention.

Movement of knee 2 may be automatically stopped at predetermined points by means of dogs 279 and 280, Figs. 3 and 6, adjustably fixed with column 1 by suitable means such as a T-slot 281, the dogs engaging respectively trip plungers 282 and 283 slidable in a bracket 284 fixed with knee 2 and engaging, through suitable rack teeth, opposite sides of a gear 285 suitably journaled in bracket 284, plunger 282 actuating, through suitable rack teeth, a gear 286 fixed with a shaft 287 journaled in a wall of knee 2 and carrying within the knee a lever 288 actuating, through a pivoted link 289, a lever 290 fixed with a shaft 291 journaled in the knee and actuating above mentioned shifter rod 256, Fig. 7, through a lever 292, Fig. 11, fixed with the shaft and engaging, through a pin 293, a member 294 fixed with the rod, pin 293 engaging a suitable slot 295 formed in member 294.

The arrangement of the parts is such that movement of lever 250 to the right, as seen in Fig. 6, will cause upward movement of knee 2 when clutch gear 268 is engaged with clutch 269 and either the feed or rapid traverse train is operative, such movement being indicated on plate 260, Fig. 7, by index 259. Through the above described linkage plunger 282, Figs. 3 and 6, will at the same time be extended into a position to contact dog 279 after the desired movement of knee 2, the plunger being pushed back by the dog and moving clutch member 248, Fig. 8, to its disengaged or neutral position, thus stopping further movement of the knee. A similar course of events will take place if lever 250 is moved to the left in Fig. 6, the knee then moving down and plunger 283 being extended into a position to contact dog 280 after predetermined desired movement of the knee.

Movement of saddle 3 may be automatically stopped at predetermined points by means of dogs 296 and 297 adjustably fixed with the saddle by suitable means as, for example, a T-slot 298, Fig. 2, the dogs encountering respectively plungers 299 and 300, Figs. 3 and 6, vertically slidable in above mentioned extending portion 25 and actuating, through shoes 301 and 302 engaged in suitable slots in the plungers, a lever 303 fixed with above mentioned shaft 291.

The parts are so arranged that movement of lever 250 to the right, as seen in Fig. 6, will, when clutch gear 261 is engaged with clutch member 222 and either the feed or rapid traverse train is operative, cause movement to the right of saddle 3, the movement being indicated by index 259, Fig. 7, against plate 260. Such movement of lever 250 raises plunger 300 into the path of dog 297, the dog encountering the plunger after a predetermined movement of saddle 3, depressing it and shifting clutch member 248 to neutral, stopping the movement of the saddle, as described for knee 2. Opposite movement of lever 250 causes opposite movement of saddle 2, the saddle then being stopped by dog 296, depressing plunger 299.

Automatic stop of table 4 is obtained as follows: Dogs 304 and 305, Fig. 2, are adjustably fixed with the table by suitable means such as T-slot 306 and act upon a pin 307 fixed with an extension of lever 237, as more particularly shown in Fig. 1, swinging the lever to neutral position after predetermined desired movement of the table in either direction.

It should be noted that the automatic controls just described are merely exemplary and other forms, many of which are well known, could be substituted therefor within the scope of the invention, and also, while the devices disclosed are arranged to cause merely automatic stop of the various supports, it is contemplated that devices might be used which would cause automatic reverse of the supports or any of them, or automatic shift between feed and rapid traverse movements. A variety of such devices being well known and readily adaptable to the structure shown, it is not considered necessary to disclose them specifically in the present application.

Power movement of spindle slide 5 may be obtained as follows: Shaft 224, as particularly shown in Figs. 1 and 6, extends backwardly into a housing 308 fixed with knee 2 and drives, through an overload release device generally denoted by numeral 309 and spiral gears, or the like, 310 and 311, a vertical shaft 312, as particularly shown in Fig. 1, shaft 312 driving, through a reverser generally denoted by numeral 313, a shaft 314 journaled in a housing 315 fixed with column 1. Gears 310 and 311 may be of substantially any desired ratio, but in the present instance are so formed as to result in a reduction in rate between shafts 224 and 312.

Shaft 314, as more particularly shown in Fig. 13, extends forwardly in housing 315 and drives, through bevel gears 316, Fig. 13, and 317 Fig. 20, a sleeve 318 journaled on a stud 319, the sleeve driving, through a gear 320, an idler 321 journaled on a stud 322, and a gear 323, a shaft 324. Shaft 324 is supported in suitable bearings 325 and 326 and actuates, through bevel gears 327 and 328, a screw 329 journaled in housing 93 and restrained against axial movement therein by suitable or well known means such as bearing 330. Screw 329 extends downwardly into a portion of head 5 and engages a nut portion 331 fixed therewith, rotation of the screw accordingly causing vertical movement of head 5. Hand wheel 46 may also actuate screw 329, as fully described presently, through a shaft 332, Fig. 28, which carries the hand wheel, shaft 332 being fixed with above mentioned gear 316, as particularly shown in Fig. 28.

Shaft 224 between housings 38 and 308, Fig. 1, is enclosed in the present instance in a telescoping housing of suitable or well known type generally denoted by numeral 333 and shaft 312 may be similarly enclosed in a housing generally denoted by numeral 334. Overload release device 309 comprises above mentioned gear 310 which, as particularly shown in Figs. 6 and 12, is journaled on shaft 224 and restrained against axial movement relative thereto in one direction by means of a suitable shoulder 335, the gear having suitable clutch teeth engaging a clutch member 336 slidably keyed with shaft 224 remote from shoulder 335. Clutch member 336 is continuously urged to the left, as seen in Figs. 6 and 12, by means of a spring 337 bearing against the clutch member and a plate or washer 338 slidably keyed with shaft 224 and axially adjustable thereon by means of a nut 339. The clutch teeth on member 336 are of a type such as shown in Fig. 12, wherein driving force between clutch member 336 and gear 310 tends to force clutch member 336 to the right against the force of spring 337. A positive driving connection is maintained by the device throughout all normal loads or stresses in the transmission mechanism leading to head 5, but in the event that excessive stress or torque develops in shaft 224 or its connected parts, clutch member 336 will overcome the pressure of spring 337 and move to the right, thus permitting relative rotation between itself and gear 310 and relieving the excessive stress.

To provide for vertical movement of knee 2, shaft 312 comprises telescoping sections 340 and 341, Fig. 1, the sections being slidably keyed together whereby relative vertical movement may take place without interference with the drive through the shaft.

Reverser 313 comprises bevel gears 342 and 343, Fig. 13, journaled on shaft 314 and spaced apart by a sleeve member 344 slidably keyed with shaft 314. Gears 342 and 343 are driven in opposite directions from a bevel gear 345 fixed with section 341 of shaft 312 and may be alternatively clutched to shaft 314 by means of a clutch member 346 slidably keyed with sleeve 344 and provided with suitable clutch teeth for engagement when moved to the left with complementary teeth formed on gear 342 and with other clutch teeth for engagement when moved to the right with complementary teeth formed on gear 343. Shaft 314 may accordingly be driven in one or the other direction according to which of gears 342 and 343 is clutched to the shaft. Clutch member 346 may be moved from a hand lever 347, Figs. 1, 15, and 29, the lever being fixed with a shaft 348, journaled in above mentioned housing 315. Shaft 348 extends forwardly toward column 1 and actuates, through a gear 349, a plunger 350 reciprocable in housing 315 and actuating, through a lever 351, Fig. 18, a similar plunger 352 spaced upwardly from plunger 350 and carrying a shifter member 353, Fig. 13, engaging an annular groove 354 formed in clutch member 346. Accordingly upward and downward movement of lever 347 will cause right and left movements respectively of clutch member 346, as seen in Fig. 13. Lever 351 is journaled on a stud 355 fixed with housing 315 and engages plungers 350 and 352 respectively by means of pivoted shoes, or the like, 356 and 357 engaging suitable slots formed in the plunger.

Clutch member 346 has an intermediate or neutral position in which it is free of engagement with either gear 342 or gear 343 and, for holding the clutch in one or another of its shifted positions, a sector 358, Fig. 15, is fixed with shaft 348 and is provided with suitable notches such as 359 and 360, Fig. 13, engaged by a detent plunger 361, Fig. 15, reciprocable in a suitable bore in an extension 362 of housing 315 and pressed into engagement with sector 358 by means of a spring 363 received in extension 362.

Since movements of shaft 314 are often comparatively rapid, and for other reasons, it is desirable that hand wheel 46 be disconnected from shaft 332 at such times as the shaft is rotated by power. For this purpose, as more particularly shown in Fig. 28, the wheel in the present instance is fixed as, for example, by means of a pin 364 with a bushing or sleeve 365 which is in turn freely rotatable upon shaft 332, being supported thereon in the present instance by means of a suitable anti-friction bearing such as roller bearing 366. The sleeve is prevented from moving axially to the left by means of a collar 367 fixed with shaft 332 and to the right by means of another collar 368 also fixed with shaft 332, the collars providing proper running clearance so that sleeve 365 and hand wheel 46 may at times rotate freely and without substantial friction on shaft 332. Conversely, upon rotation of shaft 332, owing to the relatively small amount of friction between shaft 332 and sleeve 365, the wheel will be maintained stationary by means of its considerable inertia which may possibly be assisted somewhat by the unbalanced weight of a hand grip member 369. A clutch mechanism generally denoted by numeral 370 is effective in response to the position of reverser actuating lever 347 and shaft 348 to clutch sleeve 365 rigidly with shaft 332.

Thus shaft 348 actuates, through a member 371, a lever 372 fulcrumed on a pin 373 fixed with a closure member 374, the lever having an extending portion 375 entering a suitable notch formed in the surface of member 371. Lever 372 has a forked end portion 376, as more particularly shown in Fig. 15, extending upwardly at either side of shaft 332 and engaging a sleeve 377, Fig. 28, slidable on shaft 332 and connecting, through a pin 378, with a rod 379 extending through a suitable bore in shaft 332. Pin 378 operates in suitable slots 380 and 381 extending into shaft 332 and rod 379 is continuously urged to the right in Fig. 28 by means of a spring 382 received in a counter bore 383 in shaft 332 and acting against a head 384 on shifter rod 379.

Clutch member 370 comprises a head portion 385 having suitable clutch teeth 386 for engagement with complementary teeth formed on sleeve 365, portion 385 being fixed with rod 379 by suitable means such as a cap screw 387 whereby to partake of all movements of rod 379. A sleeve or housing 388 is suitably fixed with head 385 and extends over clutch teeth 386 and a portion of sleeve 365 to enclose the clutch members and exclude foreign material. The notch in member 371 is positioned to allow movement to the right of rod 379 at the time clutch member 346, Fig. 13, reaches its neutral or disconnected position. This allows engagement of clutch 370 whereupon hand movements of the mechanism and accordingly of head 5 are permitted. In all other positions of clutch member 346 lever 372 and its connected parts including clutch member 385 are forced to the left against the resistance of spring 382, thereby disconnecting hand wheel 46 so that it will not be operated by power and will not become a source of danger to the operator or to the machine.

In this connection it is noted that, lacking the provision of the clutch mechanism 370 or, in other words, if wheel 46 were permanently fixed with the shaft 332, it is possible that considerable energy might be stored in the wheel during rapid traverse movement of head 5, shaft 332 and wheel 46 under these conditions rotating at a relatively high rate. If it were desired to stop the movement of head 5 either manually or automatically as set forth below, this energy or momentum in wheel 46 would be sufficient to continue the operation of the mechanism for a perceptible distance beyond the desired stopping point. This would obviously be very undesirable and is, of course, completely avoided by the present structure, since it is impossible for wheel 46 to attain any substantial velocity because of the substantially frictionless connection with shaft 332 existing at all times when the shaft is operating by power.

Power movement of head 5 may be automatically stopped at various desired points by means of suitable adjustable dogs 389 and 390, Fig. 13, fixed at desired points with head 5 by suitable means such as a T-slot 391, suitable bolts, or the like, 392 and 393 respectively serving to clamp dogs 389 and 390 securely in desired positions. Dog 389 upon predetermined downward movement of head 5 encounters a projecting portion 394 of above mentioned plunger 352, the transmission elements being so arranged as to cause downward movement of head 5 when plunger 352 and clutch member 346 are moved to the left. Dog 389 will move plunger 352 to the right sufficiently to disengage clutch member 346 whereupon movement of shaft 314 and accordingly of head 5 will stop, member 371, Fig. 28, simultaneously permitting engagement of clutch 370 whereupon further movement of head 5 may be obtained by hand through hand wheel 46. In similar manner dog 390 upon predetermined upward movement of head 5 encounters an extending portion 395 of plunger 350, disengaging clutch member 346 which would in this situation be engaged with gear 343, hand wheel 46 being connected as before substantially simultaneously with the interruption of the power movement. To insure stopping of head 5 in the event that either of dogs 389 and 390 is not in place, permanent dogs 396 and 397 respectively are fixed at points representing the limits of available travel of head 5 and have actuating portions 398 and 399 formed to actuate plungers 394 and 395. As more particularly shown in Figs. 1 and 19, portion 398 extends back of dog 389 and is coextensive with the actuating portion thereof at such times as dog 389 is positioned for maximum upward travel of head 5, actuating portion 399 corresponding in like manner with the actuating portion of dog 390. Thus although dogs 396 and 397 positively stop movement of head 5 at its upper and lower limits of travel, they do not reduce the possible travel of the head available between extreme settings of dogs 389 and 390.

Head 5 may be arranged for vertically moving relative to column 1 in any of a variety of different ways, a number of which are well known, but as an illustrative arrangement in the present instance, the head, as particularly shown in Fig. 19, extends backwardly into a suitable recess 400 and is guided for vertical movement in suitable slides 401 and 402 which may be of any suitable type, but in the present instance are of dove-tail form. A gib 403 is provided for well known purposes which may be utilized for temporarily clamping head 5 with column 1 by suitable means such as a lever 404 fixed with a screw 405 operating in a suitable bore in column 1 against a plunger 406 which bears under the influence of screw 405 against gib 403. This mechanism might be used for any purpose to which it is found adaptable, but it is intended particularly for clamping head 5 during cutting operations between which it is necessary to change the position of head 5, or in situations where the position of the head is changed often and clamp means is desirable which may be operated rapidly and with a maximum of convenience. For clamping head 5 when such movements are not required, bolts 407 and 408 are provided extending into recess 400 and engaging, through head portions 409 and 410, suitable grooves formed in head 5, the bolts being tightened by suitable means such as nuts 411 and 412 and serving to deform column 1 sufficiently to solidly clamp head 5 therewith.

The above described mechanism for automatically controlling movements of head 5 is useful for many purposes, certain of which are familiar, but for other uses, where it is desired to stop the bodily spindle movement with a high degree of accuracy, mechanism is provided as follows: A plurality of adjustable trip members or rods 413, Figs. 13 and 21, are adjustably fixed with head 5, preferably being carried by a rotatable member or drum 414, the rods being so arranged as to register one at a time with a trip plunger 415 slidable in a guide portion 416 extending upwardly from a part of housing 315. Downward movement of head 5 will cause one of rods 413 after a predetermined movement of the head to act on plunger 415, the plunger being connected to stop further movement of the head. Rods 413 may be axially adjusted in drum 414 by suitable means, the rods in the present instance being threaded substantially their full length and slidably keyed in bores in drum 414, each rod being fixed with the drum by means of clamping or adjusting nuts 417 and 418, the nuts, or one of them, being provided with graduations if desired whereby to accurately gauge adjustments of the rods. The slidably keyed connection of the rods with drum 414 prevents rotation of the rods and facilitates adjustments thereof.

Plunger 415 acts, through an inclined surface 419, as more particularly shown in Fig. 31, on a rod 420, slidable in housing 315 and acting, through suitable rack teeth engaging a sleeve or gear 421, Fig. 17, journaled on a stud 422, on above mentioned plunger 352. As above noted, plunger 352 is extended to the left in Fig. 13 at such times as head 5 is moving downwardly and, through the above described connections, rod 420 will also be moved to the left, thus raising plunger 415 through interaction with inclined surface 419. A spring 423, Fig. 31, may assist in this movement and may be powerful enough to maintain plunger 415 raised at all times except when depressed by one of rods 413, upward movement of the plunger being limited by engagement of a surface 424 of plunger 415 with rod 420. Depression of the plunger 415 by a rod 413 accordingly forces rod 420 and also plunger 352, Fig. 13, to the right, thus shifting clutch member 346 of reverser 313 into its above described neutral position and stopping further movement of head 5.

Such shifting of reverser 313, as above described, connects hand wheel 46 with shaft 332 and the movement of head 5 may accordingly be continued by hand to a desired setting, a predetermined position being attainable with great accuracy through a dial indicator generally denoted by numeral 425 actuated from plunger 415, as more particularly shown in Fig. 30, through a lever 426 pivoted on a stud 427, the lever engaging at one end with a slot 428 in plunger 415 and at its other end actuating the point 429 of indicator 425. The ratio of displacement of plunger 415 and point 429 may be determined by the proportions of lever 426, but conveniently the lever is proportioned to give movements of point 429 equal in extent to those of plunger 415. Thus movements of plunger 415 are indicated directly on the dial of indicator 425.

In practice plunger 415 operates to shift reverser 313 to stop the movement of head 5 during the early portion of its travel. The head is then moved further by hand through hand wheel 46, the movement being stopped at a predetermined reading of indicator 425, the head clamped, and a cut taken. If now setting of head 5 is changed, the previous setting may be reached very rapidly and accurately by the method just described, by terminating the hand movement of the head at the previous reading of indicator 425. By rotating the drum 414, another of rods 413 may be brought into range with plunger 415 and a different setting of head 5 may be reached with equal speed and accuracy, idle rods passing freely down at the sides of guide 416. In the present instance four such rods are disclosed, but obviously more or less could be equally well provided, all other parts of the structure remaining essentially the same.

Many uses for this structure will suggest themselves, a typical one of which would be the machining of a plurality of bosses or surfaces of different elevations with respect to each other on a single workpiece, the setting of the head being readily changed for each new elevation and the head being capable of rising to avoid high portions of the workpiece between the several bosses and promptly thereafter taking a position for further machining at the same or at a different elevation, all with great speed and accuracy.

For conveniently rotating drum 414, as above described, provision is made as follows: Drum 414, as particularly shown in Fig. 22, is journaled in a bearing or housing 430 and prevented from moving axially therein by suitable collars, or the like, 431 and 432. A ring member 433, Fig. 24, embraces an upper portion of drum 414, in the present instance above collar 432, the ring having a hollow grip portion 434 by which it may be manually oscillated about the axis of drum 414. A detent or pawl 435 pressed by spring 436 within grip portion 434 engages notches 437 formed in the periphery of drum 414 corresponding in angular spacing to rods 413. Ring 433 is limited in angular movement by a pin 438 fixed with a portion 439 of bearing 430 and extending into a slot 440 extending a predetermined distance in the periphery of ring 433. Oscillation of ring 433 by means of handle 434 through the range permitted by slot 440 and return will accordingly cause angular movement of drum 414 sufficient to bring a succeeding rod 413 into position over plunger 415. A detent member 441, Fig. 21, pressed by a spring 442 engages depressions 443 in the periphery of drum 414 to determine the various positions of the drum corresponding to the actuating positions of rods 413. The positioning of various rods is thus made accurate and convenient.

Further provision is made for rotation of drum 414 automatically upon the completion of a predetermined upward movement of head 5 by means of a dog 444, Fig. 22, the dog being fixed, for example, in a T-slot 445 in a portion of above mentioned housing 93 by means of a suitable bolt 446. The dog in the present instance is bifurcated as shown in Fig. 23 and carries an adjusting screw 447, Fig. 22, clamped in adjusted position by tightening of bolt 446 and acting upon upward movement of head 5 upon a cam 448 fixed with a shaft 449, Fig. 11, slidably keyed with a bushing 450, Fig. 21, journaled in a bearing 451 fixed with above mentioned portion 439. Bushing 450 actuates, through a sector 452 fixed therewith, a sector 453 fixed with above mentioned ring 433. Upward movement of head 5 accordingly causes rotation of shaft 449 in a counterclockwise direction, as seen in Fig. 12, the sector causing rotation of ring 433 and through detent 435 rotation of drum 414 in a clockwise direction, as seen in Figs. 23 and 24, the parts being proportioned so that the movement will be sufficient to position a succeeding rod 413, as above described, for the hand movements of drum 414. Upon subsequent downward movement of head 5 shaft 449 will be rotated to its original position by means of a spring 454, Figs. 21 and 23, retained in a bore 455 in a portion of head 5 by means of a pin, or the like, 456, the spring acting on a lever 457 fixed with bushing 450, the spring operating to yieldably maintain the parts in the position shown in Figs. 21 and 23.

Under certain conditions it may be desirable to avoid such automatic rotation of drum 414 upon upward movement of head 5. Shaft 449 may under these circumstances be moved to the right, as seen in Fig. 21, sliding in bushing 450 so that cam 448 will pass in front of dog 444 and not be effected thereby. For so manipulating shaft 449, a grip portion 458 extends backwardly from cam 448, and a spring pressed detent 459 operates in sockets such as 460 in the shaft to yieldingly maintain it in shifted position.

Since dog 444 is adjustable and since the only means of arresting an upward movement of head 5 resides in either of dogs 390 or 397, there is a possibility that, through misadjustment of the dogs, cam 448 would be actuated through its movement before the upward movement of head 5 would be arrested. To prevent damage in this event, the dog and cam 448 are so proportioned that such excessive travel of the head will cause only a very slight excessive movement of cam 448, insufficient to dislodge detent 441 from one of depressions 443. This is clearly shown in Figs. 25 to 27 inclusive, in which Fig. 25 shows the parts in a position corresponding to a partial actuation of cam 448. Fig. 26 shows the parts after complete actuation of the cam, and Fig. 27 shows the position after a substantially excessive upward travel of the head. It is apparent that the movement of cam 448 between Figs. 26 and 27 has been very slight.

To protect dial indicator 425 from inadvertent over-actuation of plunger 415, the plunger is provided with an extension 461, Fig. 31, proportioned to contact a stop member 462 fixed in guide 416 and positively prevent further movement of plunger 415 before indicator 425 has reached the normal limit of its movement. Such a condition is shown in Fig. 24, in which extension 461 is in contact with stop 462. Any force developed by an operator through hand wheel 46 or the connected mechanism is accordingly exerted against stop 462 instead of against the delicate mechanism of the indicator.

The above is a complete description of an illustrative embodiment of the invention as applied to the movable head of a vertical spindle milling machine.

It will be understood, however, that the positioning and trip mechanism herein described may be applied in whole or in part for predetermining the position of any of the supports or slides of the machine, as may be desired, and with only such changes or alterations as may be necessary to adapt the mechanism to the different structural relationship of the parts. That is to say, that although in the drawings it is the spindle slide whose bodily position is determined, it may in some instances be desirable or preferable to similarly determine the bodily vertical position of the knee, for instance, or the position of cross movement, in or out, of the saddle. All such modifications within the scope of the annexed claims are contemplated and considered part of the present invention.

What is claimed is:

1. In a milling machine, the combination of a base, a tool spindle member supported from said base, a work support member supported from said base, said members being relatively bodily movable, a transmission for said relative movement including a motion interrupter, a trip device operable during said relative movement for operation of said motion interrupter and approximately determinative of a certain relative position of said members, manual means operable for continuing said relative movement in the same direction after the operation of said trip device, means visibly indicating during the course of said continued movement when said members arrive at said certain position, and means operative substantially immediately after said operation of said indicating means for limiting said continued movement.

2. In a milling machine, the combination of a base, a tool spindle member supported from said base, a work support member supported from said base, said members being relatively bodily movable, a transmission for said relative movement including a motion interrupter, a shiftable trip part connected for operation of said motion interrupter, a plurality of trip elements interchangeably positionable one at a time for shifting said trip part during said relative movement and respectively approximately determinative of different relative positions of said members, means for selectively positioning any of said plurality of elements for shifting said trip part, manual means operable for continuing said relative movement in the same direction after each operation of said trip part, and means visibly indicating when said members arrive during the course of said continued movement at the one of said different positions corresponding to the last previously operative trip element.

3. In a milling machine, the combination of a base, a tool spindle member supported from said base, a work support member supported from said base, said members being relatively bodily movable, a transmission for said relative movement including a motion interrupter, a shiftable trip element connected for operation of said motion interrupter, means for shifting said trip element during said relative movement and approximately determinative of a certain relative position of said members, manual means for continuing said relative movement in the same direction after operation of said trip element, and means connected for operation in correspondence with the shifting movement of said trip element for visibly indicating when said members arrive during the course of said continued movement at said certain position.

4. In a milling machine, the combination of a base, a tool spindle member supported from said base, a work support member supported from said base, said members being relatively bodily movable, a transmission for said relative movement including a motion interrupter, a shiftable trip part connected for operation of said motion interrupter, a plurality of trip elements interchangeably positionable one at a time for shifting said trip part during said relative movement and respectively approximately determinative of different relative positions of said members, means for selectively positioning any of said plurality of elements for shifting said trip part, manual means operable for continuing said relative movement in the same direction after each operation of said trip part, and means connected for operation in correspondence with the shifting movement of said trip part and operable for visibly indicating when said members arrive during the course of said continued movement at the one of said different positions corresponding with the last previously operative trip element.

5. In a milling machine, the combination of a base, a tool spindle member supported from said base, a work support member supported from said base, said members being relatively reciprocable, a transmission for said reciprocatory movement including means for interruption of motion in either direction of reciprocation, a shiftable trip part connected to operate said motion interrupting means, a plurality of trip elements interchangeably positionable one at a time for shifting said trip part during a forward direction of said reciprocatory movement and respectively approximately determinative of different relative positions of said members, means operative during successive reverse movements for successively positioning said trip elements for the operation of said trip part during the next succeeding forward movement, manual means operable for continuing said forward movement after each operation of said trip part, and means visibly indicating when said members arrive during said continued movement at the one of said different positions corresponding to the last previously operative trip element.

6. In a milling machine, the combination of a base, a tool spindle member supported from said base, a work support member supported from said base, said members being relatively bodily movable, a transmission for said relative movement including a first motion interrupter, a trip device operable during said relative movement for operation of said motion interrupter and approximately determinative of a certain relative position of said members, a manually operable train operable for continuing said relative movement after the operation of said first motion interrupter and including a second motion interrupter, means operative substantially immediately after operation of said first motion interrupter for limiting said continued movement, and means operative to prevent a motion transmitting relation of said second interrupter except when said first interrupter is in motion interrupting position, whereby to prevent storage of an excess of inertia in said manually operable train sufficient for power operation of said movements against said limiting means.

7. In a milling machine, the combination of a base, a tool spindle member supported from said base, a work support member supported from said base, said members being relatively bodily movable, a transmission for said relative movement including a first motion interrupter, a trip device operable during said relative movement for operation of said motion interrupter and approximately determinative of a certain relative position of said members, a manually operable train operable for continuing said relative movement after the operation of said first motion interrupter and including a second motion interrupter, means operative substantially immediately after operation of said first motion interrupter for limiting said continued movement, means visibly indicating during the course of said continued movement when said members arrive at said certain position, means continuously urging said second motion interrupter into motion transmitting position, and means preventing said motion transmitting position except when said first motion interrupter is in motion interrupting position.

8. In a milling machine, the combination of a base, a tool spindle member and a work support member each supported from said base and relatively bodily reciprocable, a transmission for said relative movement including a reverser having an intermediate motion interrupting position, control means for movement of said reverser from either engaged position thereof to said intermediate position, a dog operable in the one direction of said relative movement to operate said control means, a plurality of trip elements interchangeably positionable one at a time to operate said control means during the other direction of relative movement and respectively approximately determinative of different relative positions of said members, means for positioning any of said elements for operation of said control means, manual means for continuing said relative movement in said other direction after the operation of said trip elements, and means visibly indicating when during the course of said continued movement said members arrive at the one of said different positions corresponding to the last previously operative trip element.

9. In a milling machine, the combination of an upstanding column, a work support member supported from said column for bodily movement in three mutually transverse rectilinear paths, a spindle support member supported from said column above said work support for vertical reciprocatory movement, a rotatable spindle carried by said spindle support and axially vertical, transmission mechanism for movement of said supports including a train for movement of said spindle support said train including a reverser individual thereto and shiftable from either motion transmitting position to a motion interrupting position, control means for shifting said reverser to said intermediate position including trip parts carried by said column adjacent said spindle support, a dog carried by said spindle support and adapted to contact one of said trip parts during one direction of said reciprocatory movement, a plurality of trip elements each carried by said spindle support and interchangeably adapted one at a time to contact the other of said trip parts during the other direction of said reciprocatory movement, said trip elements being respectively approximately determinative of different relative positions of said spindle support and column, a hand wheel connected with said train at a point between said reverser and support for continuing the movement of said support in said other direction after operation of said trip elements, and means visibly indicating during the course of said continued movement when said support arrives at one of said different positions corresponding to the last previously operative trip element.

JOSEPH B. ARMITAGE.